United States Patent [19]

Place

[11] 4,056,692
[45] Nov. 1, 1977

[54] DIGITAL TONE GENERATOR

[75] Inventor: Harry Place, Ridgewood, N.J.

[73] Assignee: International Telephone and Telegraph Corporation, Nutley, N.J.

[21] Appl. No.: 710,513

[22] Filed: Aug. 2, 1976

[51] Int. Cl.² ........................................... H04M 1/50
[52] U.S. Cl. .................................. 179/84 VF; 328/14
[58] Field of Search .................. 179/84 VF, 90 K; 328/14; 331/51

[56] References Cited

U.S. PATENT DOCUMENTS

| 3,778,557 | 12/1973 | Frederiksen | 179/90 K |
| 3,787,836 | 1/1974 | Hagelbarger | 328/14 |
| 3,820,028 | 6/1974 | Thomas | 328/14 |
| 3,946,164 | 3/1976 | Beeman | 179/84 VF |

Primary Examiner—William C. Cooper
Assistant Examiner—Joseph A. Popek

Attorney, Agent, or Firm—John T. O'Halloran; Alfred C. Hill

[57] ABSTRACT

A stable generator produces a reference square wave signal having a stable given frequency. Logic circuitry is coupled to the generator to provide a plurality of square wave signals each having a different predetermined frequency, each of the predetermined frequencies having a different predetermined relationship to the given frequency. A switching arrangement is coupled to the logic circuitry to select at least one of the plurality of square wave signals of the logic circuitry. A ring counter, resistor tone mixing circuit and filter are coupled to the logic circuitry to provide as an output signal of the digital tone generator a sine wave tone having a frequency equal to the predetermined frequency divided by a given factor of the selected one of the plurality of square wave signals.

41 Claims, 1 Drawing Figure

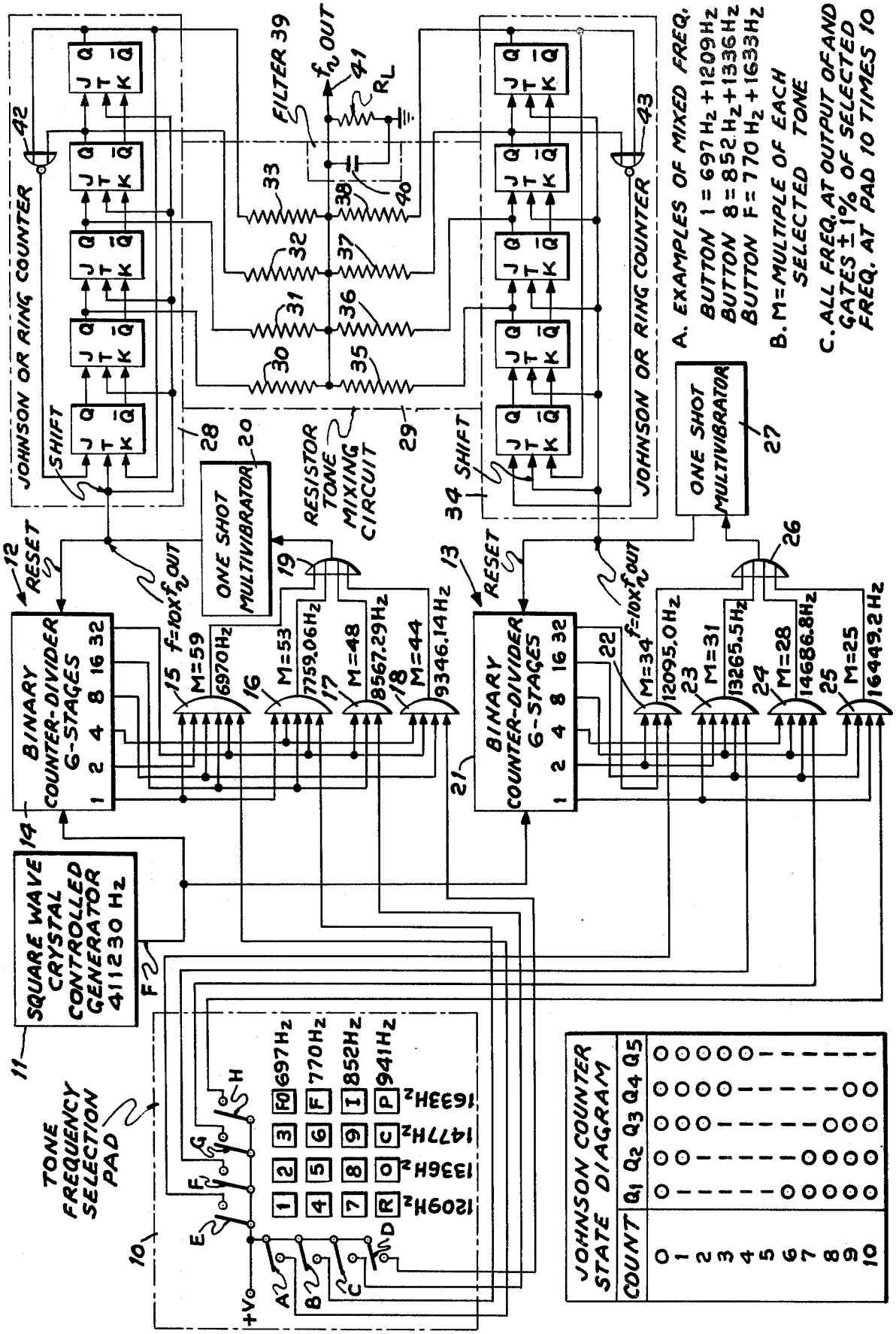

DIGITAL TONE GENERATOR

BACKGROUND OF THE INVENTION

This invention relates to tone generators and more particularly to tone generators for providing single or multiple tones.

Telephone signaling requirements often include the use of a number of tone frequencies used singly or in combination over transmission links such as in a Touch Tone telephone system. Thus, both telephone and telegraph carrier systems require multiple tone sources.

Presently telephone and telegraph signaling systems employ both RC (resistor capacitor) and LC (inductor capacitor) type oscillators of a variety of configurations to produce the desired tones. RC type tone generators are often not stable enough for some applications, although they do have the advantage that integrated circuit techniques can be employed with this type of circuit for miniaturization. In contrast, the LC type circuits can be designed to be stable enough, however, the coils are often bulky, and do not lend themselves to miniaturization by integrated circuit techniques. Both types of generators suffer in that in production, there is required the individual tuning of each tone frequency and that they require alignment or retuning as part of the maintenance procedure.

SUMMARY OF THE INVENTION

An object of the present invention is to provide a digital generator of one or more tones that may be used singly or in combination, where such tones are sinusoidal in shape, and stable in frequency.

Another object of the present invention is to provide a digital stable, multi-frequency sine wave generator that can be miniaturized by means of integrated circuit techniques.

Still another object of the present invention is to provide a digital generator for two or more sine wave frequencies derived from a single, stable oscillator or generator, and these frequencies will not require either initial adjustment in production, nor will they require alignment or retuning as part of the maintenance procedure.

A further object of the present invention is to provide a digital single or multitone generator which is adaptable to integrated circuit techniques, either conventional, or LSI (large scale integrated circuit) (where production quantities warrant having the absence of tuning requirements and which represents a cost effective approach to provide a multifrequency tone generator.

A feature of the present invention is the provision of a digital tone generator comprising: first means to generate a reference square wave signal having a stable given frequency; second means coupled to the first means to provide a plurality of square wave signals each having a different predetermined frequency, each of the predetermined frequencies having a different predetermined relationship to the given frequency; third means coupled to the second means to select at least one of the plurality of square wave signals; and fourth means coupled to the second means to provide as an output signal of the generator one sine wave tone having a frequency equal to the predetermined frequency divided by a given factor of the selected one of the plurality of square wave signals.

BRIEF DESCRIPTION OF THE DRAWING

Above-mentioned and other features and objects of this invention will become more apparent by reference to the following description taken in conjunction with the accompanying drawing, in which the single FIGURE is a logic diagram of the digital tone generator in accordance with the principles of the present invention.

DESCRIPTION OF THE PREFERRED EMBODIMENT

Referring to the FIGURE, the digital tone generator of the present invention includes a tone frequency selection pad 10 including therein a plurality of buttons which activate a pair of switches when depressed. For instance, when button 1 is depressed, switches E and A are closed to provide a potential which is a logic "1". By depressing this one button, two frequencies are simultaneously selected due to the closing of switches A and E. The other buttons also actuate two switches when depressed to select two frequencies and provide a "1" for application to logic circuitry to be discussed hereinbelow. The frequencies for purposes of explanation herein associated with the horizontal row of buttons is selected when any of these buttons are depressed, while the buttons in the vertical rows each select the same frequency associated therewith in the drawing.

The digital tone generator illustrated in the FIGURE is for the generation of two sine wave tones. However, if one of the banks switches associated with each of the buttons of pad 10 are rendered inoperative and only one half of the circuit illustrated in the Figure is employed a single tone may be generated.

The digital tone generator illustrated in the Figure includes a square wave crystal controlled generator 11 to generate a stable frequency of 411230 Hz (hertz). Generator 11 feeds its output signal to two logic circuits 12 and 13. Logic circuit 12 includes binary counter divider 14, AND gates 15 - 18, OR gate 19 and a one-shot multivibrator 20. Logic circuit 13 includes binary counter divider 21, NAD gates 22 - 25, OR gate 26 and one-shot multivibrator 27. The output signal of one-shot multivibrator 20 resets divider 14 and also provides the driving pulse for a Johnson or ring counter 28 which has certain outputs of the JK flip-flop stages thereof coupled to a resistor tone mixing circuit 29 including resistors 30 - 33, while the output signal of one-shot multivibrator 27 resets binary counter-divider 21 and also provides the driving pulse for the Johnson or ring counter 34. The outputs of the predetermined ones of the JK flip-flop stages of counter 34 are coupled to resistors 35 - 38 of circuit 29. The output from circuit 29 is coupled to a filter 39 illustrated as capacitor 40 and to a resistive load $R_L$. The desired sine wave tone having the selected frequency is provided by the output terminal 41.

In order to choose the frequency of generator 11, a number is first chosen that is an integral multiple M of each of the desired sine wave frequencies. Where the sine wave tone frequencies are not harmonically related, the number chosen can be the integral number of frequencies within the allowable tolerance of these desired frequencies. Upon establishing the common multiplier as described, the frequency of generator 11 will be a frequency ten times higher than the common multiplier and is a square wave output signal of this frequency value.

The square signal of the predetermined frequency of generator 11 drives the frequency dividers 14 and 21, each of which programmable to recycle at any desired integral number from 2 to $2^n-1$, where $n$ equals the number of stages in the frequency dividers 14 and 21.

The dividing or recycling rate is selected by the keyboard selector switches of pad 10 or other external selection switches that are provided.

AND gates 15 – 18 and AND gates 22 – 25 are respectfully coupled to the output of the stages of dividers 14 and 21 to provide the integral multiple M, the value of which is shown at the output of each of these AND gates. The value of the integral multiple M is determined by the sum of the weights of the stages of the dividers 14 and 21 to which the input of the AND gates are connected. The frequencies at the output of the AND gates 15 – 18 and 22 – 25 are the desired selected frequency within a ± 1% tolerance of the selected frequency. However, the actual value of the frequency of the square wave output of these AND gates are ten times higher as shown due to the multiplying of the common multiplier determined for generator 11 by 10. The frequency of the output of OR gate 19 is equal to the frequency of generator 11 divided by the multiple M. For instance, if switch A is closed, AND gate will be enabled and will produce a frequency of 411230 divided by 59. If switch C is closed, AND gate 17 will produce an output at OR gate 19 equal to 411230 divided by 48. Thus, the outputs from OR gates 19 and 26 are equal to F (the frequency output of generator 11) divided by M of the enabled AND gate.

Each pulse received from generator 11 by dividers 14 and 21 increments the divider by one count. Upon reaching the desired, selected count, all legs of the AND gate enabled by a switch of pad 10 will be at "1" providing a "1" at the output of the enabled AND gate. This signal when obtained and reaching the OR gates 19 and 26 will cause a "1" to be generated at the output of these OR gates. The output signal of the OR gate is coupled to a one-shot multivibrator 20 or 27, or any other pulse-stretcher stage in order to provide a reset pulse of adequate width to reliably reset the dividers 14 and 21 to zero. Other presettable counter configurations may be used and are workable.

The reset pulse from multivibrators 20 and 27 resetting dividers 14 and 21 to zero will occur at ten times the value of the desired tone wave frequency. In addition to resetting dividers 14 and 21, the reset pulse also drives the associated Johnson or ring counters 28 and 34. The property of a Johnson counter, a five-stage shift register using JK flip-flops fed back on itself through NOR gates 42 and 43, is that during the first five pulses the counters 28 and 34 will successively load up with "1"'s, then the reverse will take place, i.e., the counters 28 and 34 will load all "0"'s. This loading operation is illustrated in the Johnson counter state diagram shown in the Figure. Ten steps are required to complete the loading cycle at which time the cycle will continue to repeat.

If resistor taps are provided for each stage of the Johnson counter, and the resistor values of the network 29 are chosen to represent a total current flow to approximate a sine wave (in 1/10 or 36° steps) then, if these resistor values are chosen, and the current flows into a resistor whose value is relatively small in relation to the resistor tap values, the voltage across the load resistor $R_L$ is proportional to the current flow, and the waveshape approximates a sine wave quantized in ten steps. $f_{\sim out}$ is equal to $f_{\sim 1} + f_{\sim 2}$, where $f_{\sim 1}$ is equal to 1/10 of the pulse rate of the frequency of the signal applied to the Johnson counter 28 and $f_{\sim 2}$ is equal to 1/10 of the pulse rate of the frequency of the input signal applied to Johnson counter 34. As a result, the two selected tones processed by the Johnson counters 28 and 34 will appear at the output terminal 41.

A small value bypass capacitor 40 will remove the quantization ripple and filter out the high order harmonics leaving a relatively clean sine wave tone signal. For multiple tones, additional Johnson counters and resistor mixing circuits may be added to accomodate the mixing of three or more tones.

Because the output of the dividers 14 and 21 is ten times the selected frequency and the Johnson counters require ten steps per cycle, the output sine wave tone will have the frequency selected by the depressed button in pad 10.

The stability and accuracy of the calculated tones will be equal to that of the crystal conrolled generator 11, and no further adjustments are required.

While I have described above the principles of my invention in connection with specific apparatus it is to be clearly understood that this description is made only by way of example and not as a limitation to the scope of my invention as set forth in the objects thereof and in the accompanying claims.

I claim:

1. A digital tone generator comprising:
   first means to generate a reference square wave signal having a stable given frequency;
   second means coupled to said first means to provide a plurality of square wave signals each having a different predetermined frequency, each of said predetermined frequencies having a different predetermined relationship to said given frequency;
   third means coupled to said second means to select at least one of said plurality of square wave signals; and
   fourth means coupled to said second means responsive only to said selected one of said plurality of square wave signals to provide as an output signal of said generator one sine wave tone having a frequency equal to said predetermined frequency divided by a given factor greater than two of said selected one of said plurality of square wave signals.

2. A generator according to claim 1, wherein
   said third means selects at least two of said plurality of square wave signals.

3. A generator according to claim 2, wherein
   said fourth means combines said two of said plurality of square wave signals and provides as an output signal of said generator two sine wave tones each having a frequency equal to a different one of said predetermined frequencies of said selected two of said plurality of square wave signals.

4. A generator according to claim 1, wherein
   said second means includes
   a logic circuit coupled to said first means.

5. A generator according to claim 4, wherein
   said third means includes
   a plurality of switches coupled to said logic circuit, each of said plurality of switches being associated with a different one of said plurality of square wave signals, an associated one of said plurality of switches coupling a voltage to said logic circuit to enable said logic circuit to select said associated one of said plurality of square wave signals.

6. A generator according to claim 5, wherein said fourth means includes
- a ring counter having a given number of stages coupled to said logic circuit responsive to said selected one of said plurality of square wave signals to divide the frequency of said selected one of said plurality of square wave signals by said given factor,
- a resistor network coupled to an output of predetermined ones of said stages, and
- a filter coupled to said resistor network to provide said one sine wave tone.

7. A generator according to claim 6, wherein said ring counter is a Johnson counter.

8. A generator according to claim 6, wherein said resistor network includes
- a plurality of parallel resistors each coupled between said output of one of said predetermined ones of said stages and a common point.

9. A generator according to claim 6, wherein said filter includes
- a capacitor coupled between said resistor network and ground potential.

10. A generator according to claim 6, wherein said ring counter is a Johnson counter having N stages, where N is an integer greater than one; said resistor network includes
- a plurality of parallel resistors each coupled between an output of one of the last (N − 1) of said N stages and a common point; and said filter includes
- a capacitor coupled between said common point and ground potential.

11. A generator according to claim 6, wherein said logic circuit includes
- a binary divider coupled to said first means, said divider having a plurality of output taps,
- a plurality of AND gates each coupled to appropriate ones of said plurality of output taps to provide a different one of said plurality of square wave signals and to an associated one of said plurality of switches to select said one of said plurality of square wave signals when said associated one of said plurality of switches is closed to couple a voltage to an associated one of said plurality of AND gates for enabling thereof to select said one of said plurality of square wave signals,
- an OR gate coupled to the outputs of each of said plurality of AND gates, and
- a one-shot multivibrator coupled to said OR gate, said divider and said ring counter to produce a pulse from said selected one of said plurality of square wave signals at the output of said OR gate to reset said divider and to shift said ring counter.

12. A generator according to claim 1, wherein said third means includes
- a plurality of switches coupled to said second means, each of said plurality of switches being associated with a different one of said plurality of square wave signals, an associated one of said plurality of switches coupling a voltage to said second means to enable said second means to select said associated one of said plurality of square wave signals.

13. A generator according to claim 12, wherein said fourth means includes
- a ring counter having a given number of stages coupled to said second means responsive to said selected one of said plurality of square wave signals to divide the frequency of said selected one of said plurality of square wave signals by said given factor,
- a resistor network coupled to an output of predetermined ones of said stages, and
- a filter coupled to said resistor network to provide said one sine wave tone.

14. A generator according to claim 13, wherein said ring counter is a Johnson counter.

15. A generator according to claim 13, wherein said resistor network includes
- a plurality of parallel resistors each coupled between said output of one of said predetermined ones of said stages and a common point.

16. A generator according to claim 13, wherein said filter includes
- a capacitor coupled between said resistor network and ground potential.

17. A generator according to claim 13, wherein said ring counter is a Johnson counter having N stages, where N is an integer greater than one; said resistor network includes
- a plurality of parallel resistors each coupled between an output of one of the last (N − 1) of said N stages and a common point; and said filter includes
- a capacitor coupled between said common point and ground potential.

18. A generator according to claim 13, wherein said second means includes
- a binary divider coupled to said first means, said divider having a plurality of output taps,
- a plurality of AND gates each coupled to appropriate ones of said plurality of output taps to provide a different one of said plurality of square wave signals and to an associated one of said plurality of switches to select said one of said plurality of square wave signals when said associated one of said plurality of switches is closed to couple a voltage to an associated one of said plurality of AND gates for enabling thereof to select said one of said plurality of square wave signals,
- an OR gate coupled to the outputs of each of said plurality of AND gates, and
- a one-shot multivibrator coupled to said OR gate, said divider and said ring counter to produce a pulse from said selected one of said plurality of square wave signals at the output of said OR gate to reset said divider and to shift said ring counter.

19. A generator according to claim 1, wherein said fourth means includes
- a ring counter having a given number of stages coupled to said first means responsive to said selected one of said plurality of square wave signals to divide the frequency of said selected one of said plurality of square wave signals by said given factor,
- a resistor network coupled to an output of predetermined ones of said stages, and
- a filter coupled to said resistor network to provide said one sine wave tone.

20. A generator according to claim 19, wherein said ring counter is a Johnson counter.

21. A generator according to claim 19, wherein said resistor network includes a plurality of parallel resistors each coupled between said output of one of said predetermined ones of said stages and a common point.

22. A generator according to claim 19, wherein
said filter includes
 a capacitor coupled between said resistor network and ground potential.

23. A generator according to claim 19, wherein
said ring counter is a Johnson counter having N stages, where N is an integer greater than one;
said resistor network includes
 a plurality of parallel resistors each coupled between an output of one of the last (N − 1) of said N stages and a common point; and
said filter includes
 a capacitor coupled between said common point and ground potential.

24. A generator according to claim 19, wherein
said second means includes
 a binary divider coupled to said first means, said divider having a plurality of output taps,
 a plurality of AND gates each coupled to appropriate ones of said plurality of output taps to provide a different one of said plurality of square wave signals and to an associated one of said plurality of switches to select said one of said plurality of square wave signals when said associated one of said plurality of switches is closed to couple a voltage to an associated one of said plurality of AND gates for enabling thereof to select said one of said plurality of square wave signals,
 an OR gate coupled to the outputs of each of said plurality of AND gates, and
 a one-shot multivibrator coupled to said OR gate, said divider and said ring counter to produce a pulse from said selected one of said plurality of square wave signals at the output of said OR gate to reset said divider and to shift said ring counter.

25. A generator according to claim 1, wherein
said second means includes
 a binary divider coupled to said first means, said divider having a plurality of output taps,
 a plurality of AND gates each coupled to appropriate ones of said plurality of output taps to provide a different one of said plurality of square wave signals and to an associated one of said plurality of switches to select said one of said plurality of square wave signals when said associated one of said plurality of switches is closed to couple a voltage to an associated one of said plurality of AND gates for enabling thereof to select said one of said plurality of square wave signals,
 an OR gate coupled to the outputs of each of said plurality of AND gates, and
 a one-shot multivibrator coupled to said OR gate, said divider and said ring counter to produce a pulse from said selected one of said plurality of square wave signals at the output of said OR gate to reset said divider and to shift said ring counter.

26. A generator according to claim 1, wherein
said second means includes
 a first logic circuit coupled to said first means to provide one half of said plurality of square wave signals, and
 a second logic circuit coupled to said first means to provide the other half of said plurality of square wave signals.

27. A generator according to claim 26, wherein
said third means includes
 a first plurality of switches coupled to said first logic circuit, each of said first plurality of switches being associated with a different one of said one half of said plurality of square wave signals, an associated one of said first plurality of switches coupling a voltage to said first logic circuit to select said associated one of said one half of said plurality of square wave signals, and
 a second plurality of switches coupled to said second logic circuit, each of said second plurality of switches being associated with a different one of said other half of said plurality of square wave signals, an associated one of said second plurality of switches coupling a voltage to said second logic circuit to select said associated one of said other half of said plurality of square wave signals.

28. A generator according to claim 27, wherein
said fourth means includes
 a first ring counter having a given number of stages coupled to said first logic circuit responsive to said selected one of said one half of said plurality of square wave signals to divide the frequency of said selected one of said one half of said plurality of square wave signals by said given factor,
 a first resistor network coupled to an output of predetermined ones of said stages of said first ring counter,
 a filter coupled to said first resistor network to provide said one sine wave tone,
 a second ring counter having a given number of stages coupled to said second logic circuit responsive to said selected one of said other half of said plurality of square wave signals to divide the frequency of said selected one of said other half of said plurality of square wave signals by said given factor, and
 a second resistor network coupled to an output of predetermined ones of said stages of said second ring counter and said filter to provide a second sine wave tone having a frequency equal to said predetermined frequency divided by said given factor of said selected one of said other half of said plurality of square wave signals.

29. A generator according to claim 28, wherein
each of said first and second ring counters include a Johnson counter.

30. A generator according to claim 28, wherein
said first resistor network includes
 a first plurality of parallel resistors each coupled between said output of one of said predetermined ones of said stages of said first ring counter and a common point; and
said second resistor network includes
 a second plurality of parallel resistors each coupled between said output of one of said predetermined ones of said stages of said second ring counter and said common point.

31. A generator according to claim 28, wherein
said filter includes
 a capacitor coupled between said first and second resistor networks and ground potential.

32. A generator according to claim 28, wherein
each of said first and second ring counters is a Johnson counter having N stages, where N is an integer greater than one;
said first resistor network includes a first plurality of parallel resistors each coupled between an output of one of the last (N − 1) of said N stages of one of said Johnson counters and a common point;

said second resistor network includes
a second plurality of parallel resistors each coupled between an output of one of the last (N − 1) of said N stages of the other of said Johnson counters and said common point; and said filter includes
a capacitor coupled between said common point and ground potential.

33. A generator according to claim 28, wherein said first logic circuit includes
a first binary divider coupled to said first means, said first divider having a first plurality of output taps,
a first plurality of AND gates each coupled to appropriate ones of said first plurality of output taps to provide a different one of said one half of said plurality of square wave signals and to an associated one of said first plurality of switches to select said one of said one half of said plurality of square wave signals when said associated one of said first plurality of switches is closed to couple a voltage to an associated one of said first plurality of said AND gates for enabling thereof to select said one of said one half of said plurality of square wave signals,
a first OR gate coupled to the outputs of each of said first plurality of AND gates, and
a first one shot multivibrator coupled to said first OR gate, said first divider and said first ring counter to produce a pulse from said selected one of said one half of said plurality of square wave signals at the output of said first OR gate to reset said first divider and to shift said first ring counter; and said second logic circuit includes
a second binary divider coupled to said first means, said second divider having a second plurality of output taps,
a second plurality of AND gates each coupled to appropriate ones of said second plurality of output taps to provide a different one of said other half of said plurality of square wave signals and to an associated one of said second plurality of switches to select said one of said other half of said plurality of square wave signals when said associated one of said second plurality of switches is closed to couple a voltage to an associated one of said second plurality of AND gates for enabling thereof to select said one of said other half of said plurality of square wave signals,
a second OR gate coupled to the outputs of each of said second plurality of AND gates, and
a second one-shot multivibrator coupled to said second OR gate, said second divider and said second ring counter to produce a pulse from said selected one of said other half of said plurality of square wave signals at the output of said second OR gate to reset said second divider and to shift said second ring counter.

34. A generator according to claim 1, wherein said third means includes
a first plurality of switches coupled to said second means, each of said first plurality of switches being associated with a different one of one half of said plurality of square wave signals, an associated one of said first plurality of switches coupling a voltage to said second means to select said associated one of said one half of said plurality of square wave signals, and
a second plurality of switches coupled to said second means, each of said second plurality of switches being associated with a different one of the other half of said plurality of square wave signals, an associated one of said second plurality of switches coupling a voltage to said second means to select said associated one of said other half of said plurality of square wave signals.

35. A generator according to claim 1, wherein said fourth means includes
a first ring counter having a given number of stages coupled to said second means responsive to said selected one of one half of said plurality of square wave signals to divide the frequency of said selected one of said one half of said plurality of square wave signals by said given factor,
a first resistor network coupled to an output of predetermined ones of said stages of said first ring counter,
a filter coupled to said first resistor network to provide said one sine wave tone,
a second ring counter having a given number of stages coupled to said second means responsive to said selected one of the other half of said plurality of square wave signals to divide the frequency of said selected one of said other half of said plurality of square wave signals by said given factor, and
a second resistor network coupled to an output of predetermined ones of said stages of said second ring counter and said filter to provide a second sine wave tone having a frequency equal to said predetermined frequency divided by said given factor of said selected one of said other half of said plurality of square wave signals.

36. A generator according to claim 35, wherein each of said first and second ring counters include a Johnson counter.

37. A generator according to claim 35, wherein said first resistor network includes
a first plurality of parallel resistors each coupled between said output of one of said predetermined ones of said stages of said first ring counter and a common point; and said second resistor network includes
a second plurality of parallel resistors each coupled between said output of one of said predetermined ones of said stages of said second ring counter and said common point.

38. A generator according to claim 35, wherein said filter includes
a capacitor coupled between said first and second resistor networks and ground potential.

39. A generator according to claim 35, wherein each of said first and second ring counters is a Johnson counter having N stages, where N is an integer greater than one;

said first resistor network includes
a first plurality of parallel resistors each coupled between an output of one of the last (N − 1) of said N stages of one of said Johnson counters and a common point;

said second resistor network includes a second plurality of parallel resistors each coupled between an output of one of the last (N − 1) of said N stages of the other of said Johnson counters and said common point; and said filter includes
a capacitor coupled between said common point and ground potential.

40. A generator according to claim 35, wherein
said second means includes
a first binary divider coupled to said first means, said first divider having a first plurality of output taps,
a first plurality of AND gates each coupled to appropriate ones of said first plurality of output taps to provide a different one of said one half of said plurality of square wave signals and to an associated one of said first plurality of switches to select said one of said one half of said plurality of square wave signals when said associated one of said first plurality of switches is closed to couple a voltage to an associated one of said first plurality of said AND gates for enabling thereof to select said one of said one half of said plurality of square wave signals,
a first OR gate coupled to the outputs of each of said first plurality of AND gates,
a first one-shot multivibrator coupled to said first OR gate, said first divider and said first ring counter to produce a pulse from said selected one of said one half of said plurality of square wave signals at the output of said first OR gate to reset said first divider and to shift said first ring counter,
a second binary divider coupled to said first means, said second divider having a second plurality of output taps,
a second plurality of AND gates each coupled to appropriate ones of said second plurality of output taps to provide a different one of said other half of said plurality of square wave signals and to an associated one of said second plurality of switches to select said one of said other half of said plurality of square wave signals when said associated one of said second plurality of switches is closed to couple a voltage to an associated one of said second plurality of AND gates for enabling thereof to select said one of said other half of said plurality of square wave signals,
a second OR gate coupled to the outputs of each of said second plurality of AND gates, and
a second one-shot multivibrator coupled to said second OR gate, said second divider and said second ring counter to produce a pulse from said selected one of said other half of said plurality of square wave signals at the output of said second OR gate to reset said second divider and to shift said second ring counter.

41. A generator according to claim 1, wherein
said second means includes
a first binary divider coupled to said first means, said first divider having a first plurality of output taps,
a first plurality of AND gates each coupled to appropriate ones of said first plurality of output taps to provide a different one of said one half of said plurality of square wave signals and to an associated one of said first plurality of switches to select said one of said one half of said plurality of square wave signals when said associated one of said first plurality of switches is closed to couple a voltage to an associated one of said first plurality of said AND gates for enabling thereof to select said one of said one half of said plurality of square wave signals,
a first OR gate coupled to the outputs of each of said first plurality of AND gates,
a first one shot multivibrator coupled to said first OR gate, said first divider and said first ring counter to produce a pulse from said selected one of said one half of said plurality of square wave signals at the output of said first OR gate to reset said first divider and to shift said first ring counter,
a second binary divider coupled to said first means, said second divider having a second plurality of output taps,
a second plurality of AND gates each coupled to appropriate ones of said second plurality of output taps to provide a different one of said other half of said plurality of square wave signals and to an associated one of said second plurality of switches to select said one of said other half of said plurality of square wave signals when said associated one of said second plurality of switches is closed to couple a voltage to an associated one of said second plurality of AND gates for enabling thereof to select said one of said other half of said plurality of square wave signals,
a second OR gate coupled to the outputs of each of said second plurality of AND gates, and
a second one-shot multivibrator coupled to said second OR gate, said second divider and said second ring counter to produce a pulse from said selected one of said other half of said plurality of square wave signals at the output of said second OR gate to reset said second divider and to shift said second ring counter.

* * * * *